United States Patent [19]

Sorensen

[11] 4,214,449

[45] Jul. 29, 1980

[54] THERMAL ENERGY CONVERSION SYSTEM UTILIZING EXPANDITES

[76] Inventor: Jens O. Sorensen, P.O. Box 2274, Rancho Santa Fe, Calif. 92067

[21] Appl. No.: 25,800

[22] Filed: Apr. 2, 1979

[51] Int. Cl.² .............................................. F03G 7/00
[52] U.S. Cl. ........................................ 60/641; 60/398
[58] Field of Search ................ 417/108; 60/641, 398

[56] References Cited

U.S. PATENT DOCUMENTS

| | | | |
|---|---|---|---|
| 3,805,515 | 4/1974 | Zener | 60/641 |
| 3,967,449 | 7/1976 | Beck | 60/641 |
| 3,995,160 | 11/1976 | Zener et al. | 60/641 |
| 4,087,975 | 5/1978 | Owens | 60/641 |
| 4,104,883 | 8/1978 | Naef | 60/641 |

Primary Examiner—Allen M. Ostrager
Attorney, Agent, or Firm—Brown & Martin

[57] ABSTRACT

An ocean thermal energy conversion system includes a mass of expandites that change density in response to changes in temperature at a given pressure to thereby change buoyancy with respect to ocean water; a mass transport conduit circuit for introducing the expandites to ocean water at different combinations of temperature and pressure and transporting the expandites and ocean water in response to pressure differentials created by density changes and concomitant buoyancy changes of the expandites as the expandites are exposed to ocean water at different combinations of pressure and temperature; and a transducer such as a turbo-electric generator for converting the pressure of water transported by the circuit to electrical energy. Expandites are defined as separate objects that expand or contract when heated or cooled, thereby changing their density. The disclosed expandites includes substances encased in plastic bags, such as ammonia which expands upon undergoing a phase transformation upon going from a liquid to a gas, and nitro benzene which expands upon undergoing a phase transformation from a liquid to a solid.

46 Claims, 5 Drawing Figures

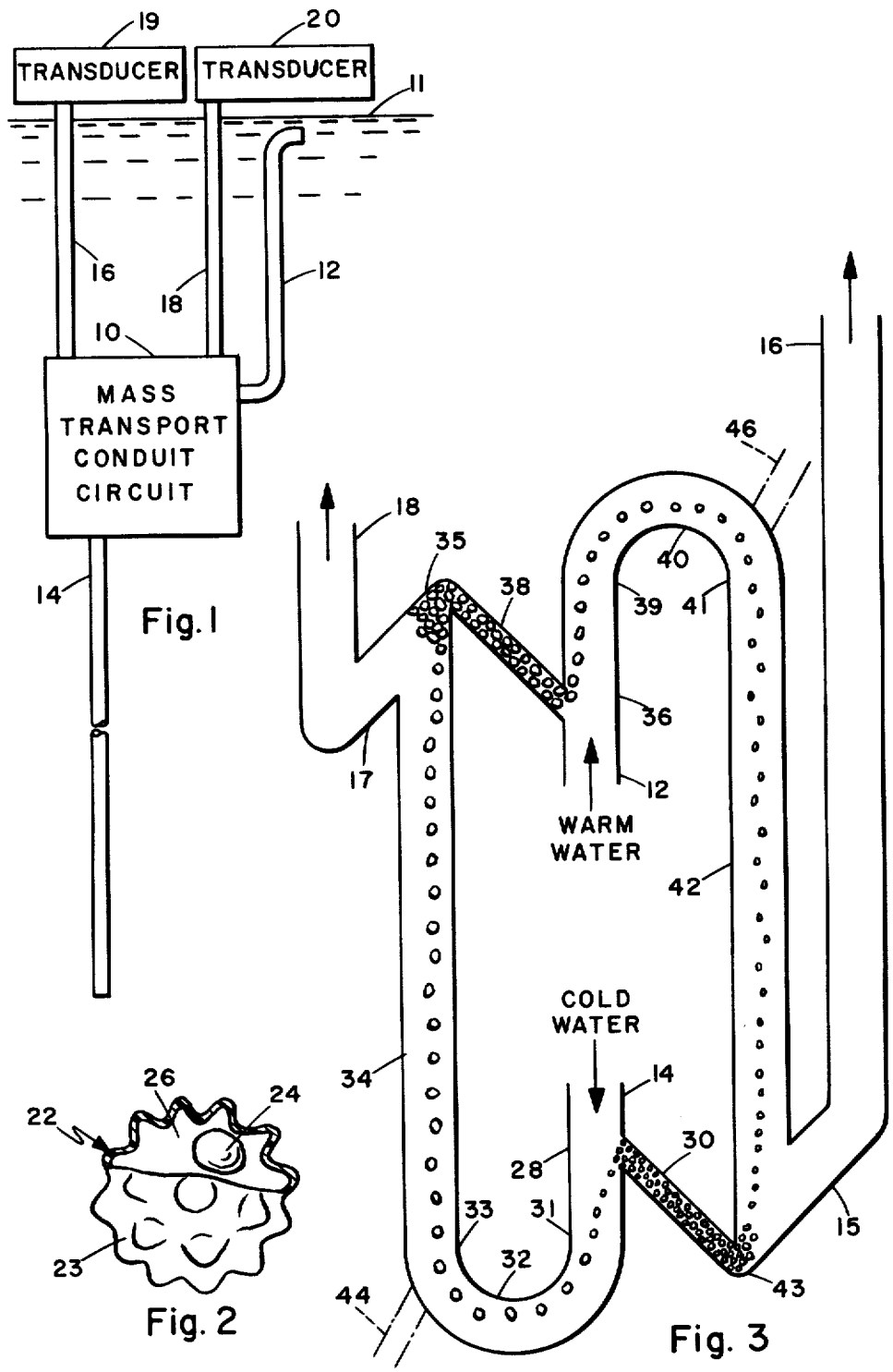

THERMAL ENERGY CONVERSION SYSTEM UTILIZING EXPANDITES

BACKGROUND OF THE INVENTION

The present invention generally pertains to thermal energy conversion systems and is particularly directed to an improvement in ocean thermal energy conversion systems.

In typical ocean thermal energy conversion systems warm surface water is used to heat a working fluid with a low boiling point. Ammonia is a typical working fluid. The fluid is heated in a boiler. Vapor released from the boiler turns a turboelectric generator. The vapor is then cooled by frigid water that is drawn up from deep in the ocean. The vapor condenses, and is pressurized and returned to the boiler; and the cycle is repeated.

Heretofore, it has been believed that ocean thermal energy conversion systems must be deployed in at least sub-tropical waters in order to obtain a large enough temperature differential within the ocean to provide a system that is sufficiently efficient to warrant commercial development.

One concern with typical ocean thermal energy conversion systems, is their relatively low efficiently, which is affected significantly by the fact that considerable energy is expended in pumping the water and the working fluid throughout the system.

Another concern with typical ocean thermal energy conversion systems, is "biofouling", which is the growth of algae on heat exchangers. Biofouling absorbs energy from the system.

SUMMARY OF THE INVENTION

The present invention is a thermal energy conversion system and method for converting a relatively low temperature differential in fluids into a high pressure differential at a minimum of capital investment, cost and maintenance.

Although the present invention is particularly directed to an ocean thermal energy conversion system, it also is applicable to other types of thermal energy conversion systems, including those in which the surrounding fluid is other than water.

The thermal energy conversion system of the present invention includes a mass of expandites that change density in response to changes in temperature at a given pressure to thereby change buoyancy with respect to a surrounding fluid; a mass transport conduit circuit for introducing the expandites to a surrounding fluid at different combinations of temperature and pressure and transporting the expandites and surrounding fluid in response to pressure differentials created by density changes and concomitant buoyancy changes of the expandites as the expandites are exposed to the surrounding fluid at different combinations of pressure and temperature; and a transducer for converting the pressure of fluid transported by the circuit to a useful form of energy. Expandites are defined as separate objects that expand or contract when heated or cooled, thereby changing their density. Some expandites expand upon being heated, while others expand upon being cooled. As a separate object, each expandite maintains its integrity with respect to the surrounding fluid, whereby it is not broken up and dissolved or dispersed in the surrounding fluid upon being introduced to the surrounding fluid.

When the expandites have a lower or higher density than the surrounding fluid they will be buoyant or nonbuoyant respectively, and will rise or sink, thereby creating a pressure differential in the fluid which causes movement of the fluid through propulsion and suction. This is the same effect as is created by a propeller.

Other features and various advantages of the present invention are discussed in relation to the description of the preferred embodiments.

BRIEF DESCRIPTION OF THE DRAWING

FIG. 1 is a schematic block diagram of an ocean thermal energy conversion system according to the present invention.

FIG. 2 illustrates preferred embodiment of an expandite unit.

FIG. 3 is a schematic diagram of a preferred embodiment of the system of the present invention utilizing expandites that expand upon being cooled and undergo a buoyancy reversal with respect to ocean water at a given sub-surface ocean temperature.

DESCRIPTION OF THE PREFERRED EMBODIMENTS

Figure 4:
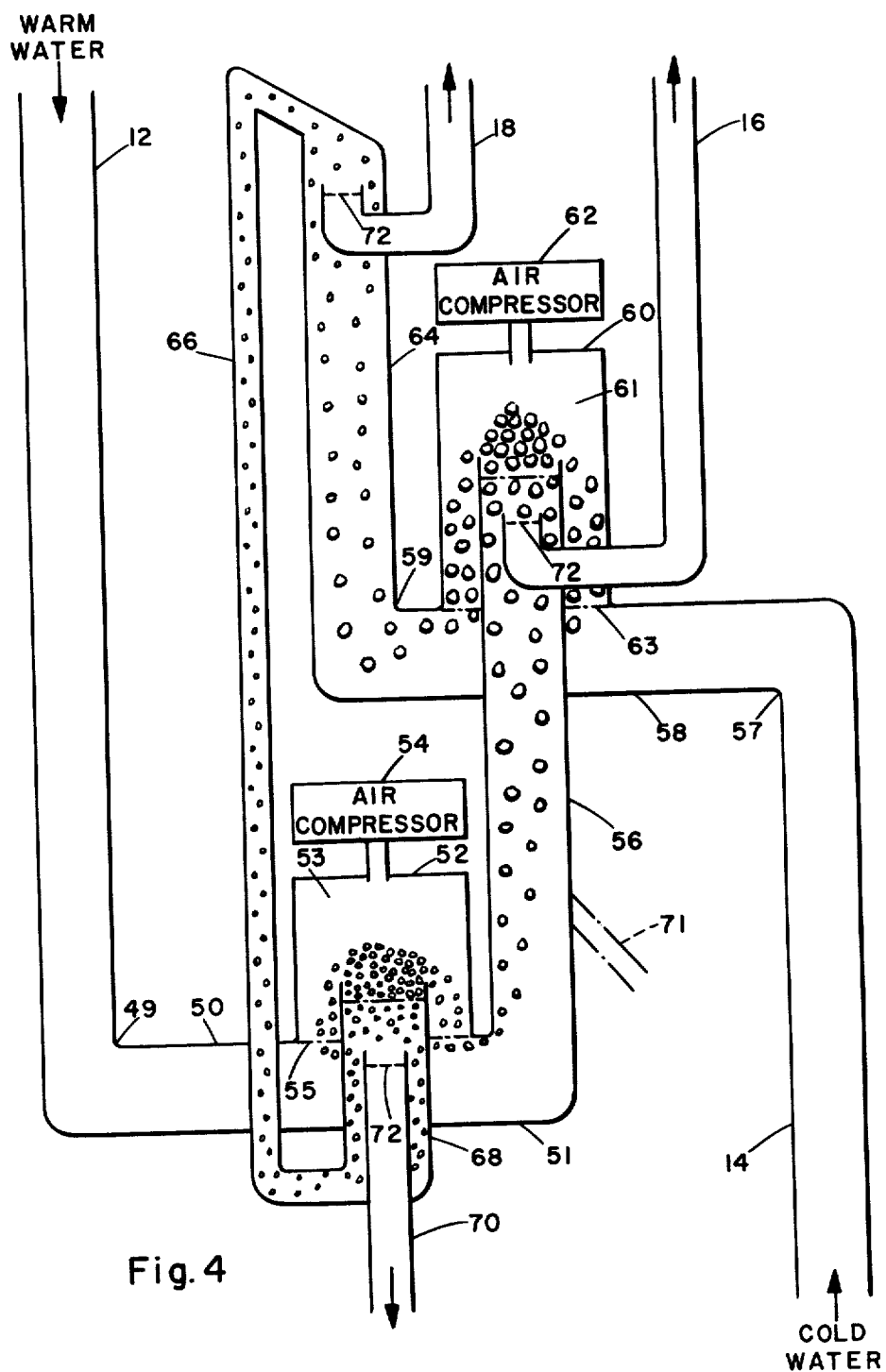
FIG. 4 is a schematic diagram of a preferred embodiment of the present invention utilizing expandites that are buoyant in ocean water and expand upon being heated.

Referring to FIG. 1, the mass transport conduit circuit 10 is deployed beneath the ocean surface 11 at a depth that is dependent upon the temperature/phase properties of the expandites. This depth is approximately 100 meters when ammonia is used as the expandite, and is approximately 600 meters when carbon dioxide is used as the expandite, for example.

The mass transport conduit circuit 10 includes a warm water intake conduit 12 which extends to near the ocean surface 11, a cold water intake conduit 14 which extends deep into the ocean, a warm water exhaust conduit 16 and a cold water exhaust 18. The warm water exhaust conduit 16 and the cold water exhaust conduit 18 are coupled to transducers 19 and 20 which convert the pressure of the water transported to the surface in the conduits 16 and 18 into a useful form of energy. Turboelectric generators are preferred as transducers. However, other transducers may be used to convert the pressure of the water flow to other forms of energy, such as hydrogen, for example.

Many expandites are fluid during at least a portion of each energy production cycle; and it is preferable that they be encased to prevent their dispersion and/or disolution in the ocean water, or break-down by reason of contact with the components of the conduit circuit. Thus, the expandite units include a mass of expandites and a plurality of flexible coverings respectively encasing the expandites. The coverings are a material that is insoluble in both the expandite and ocean water. For expandites such as ammonia, carbon dioxide, nitro benzene, octoic acid and monoic acid, the flexible coverings can be plastic.

Referring to FIG. 2, each expandite unit 22 has a covering 23 that has a drag inducing configuration with respect to the surrounding fluid and an outside surface that is configured to minimize drag with respect to the conduits.

When it is desired to change the average density of an expandite unit 22, a third material 24 is included in the expandite 26. The third material 24 has a density that normally differs from that of the expandite 26, whereby the average density of each expandite unit 22 is different from the density of the encased expandite 26. In order to achieve wanted densities at a given pressure and temperature gradiant it may be advantageous to have compartmentalized expandite units with different expandite materials in each compartment. It may be advantageous to change the average density of the expandite unit so as to obtain a buoyancy reversal at a given combination of temperatures and pressure, when such is desired. In referring to the buoyancy of the expandite herein, this expression is meant to refer to the buoyancy of the expandite unit.

One preferred embodiment of an ocean thermal energy conversion system according to the present invention is described in relation to FIG. 3. In the embodiment shown in FIG. 3 the expandites have the properties of becoming less dense with a decrease in temperature at a given pressure and undergoing a reversal in buoyancy with respect to ocean water at a given combination of sub-surface ocean temperature and pressure. The expandites are shown throughout the drawing as circles of various sizes which are exaggerated to illustrate contraction and expansion. The preferred expandite is nitro benzene which undergoes a phase transformation from a liquid to a solid and a buoyancy change at approximately 9° C. Alternative expandites include octoic acid which undergoes a buoyancy change at about 16° C. and monoic acid which undergoes a buoyancy change at about 12° C.

The mass transport conduit circuit includes a cold water intake conduit 14, a first vertical conduit 28, a first oblique conduit 30, a first U-shaped conduit 32, a second vertical conduit 36, a second oblique conduit 38, a second U-shaped conduit 40, a fourth vertical conduit 42, a cold water exhaust conduit 18 and a warm water exhaust conduit 16. The system is deployed in the ocean where the surface water temperature is sufficiently greater than the given temperature at which the expandite undergoes a buoyancy reversal.

The cold water intake conduit 14 extends to an ocean depth where the water temperature is substantially below the given sub-surface ocean temperature for introducing cold water from such depth into the circuit. The ocean water temperature is approximately 4° C. at a depth of approximately 800 meters.

The first vertical conduit 28 is coupled to the cold water intake conduit 14 for receiving the cold water.

The first oblique conduit 30 is coupled to the first vertical conduit 28 below the cold water intake conduit 14, and is slanted downward with respect to the first vertical conduit 28 for gradually introducing into the first vertical conduit 28, expandites flowing from the remainder of the circuit that are at a temperature that causes them to be non-buoyant with respect to ocean water. As a result, the expandites fall within the first vertical conduit 28 upon introduction thereto.

The first U-shaped conduit 32 has an inlet end 31 coupled to the bottom of the first vertical conduit 28 and an outlet end 33, that extends vertically for enabling expandites falling from the first vertical conduit 28 to flow upward from the outlet end 33 of the first U-shaped conduit 32 as the expandites expand upon becoming less dense and thereby become buoyant in response to contact with the cold water.

The second vertical conduit 34 is for transporting the buoyant expandites and the water vertically upward in response to a pressure differential created in the water flowing through the circuit by the expansion of the expandites.

The warm water intake conduit 12 extends to near the ocean surface 11 for introducing warm water having a temperature substantially above the given sub-surface ocean temperature into the circuit from the surface.

The third vertical conduit 36 is coupled to the warm water intake conduit 12 for receiving warm water.

The second oblique conduit 38 is coupled to the third vertical conduit 36 above the warm water intake conduit 12, and is slanted downward from the second vertical conduit 34 to the third vertical conduit 36, for collecting expandites rising within the second vertical conduit 34 and for gradually introducing the collected expandites into the third vertical conduit 36. The expandites rise within the third vertical conduit 36 upon introduction thereto.

The second U-shaped conduit 40 has an inlet end 39 coupled to the top of the third vertical conduit 36 and an outlet end 41 that extends vertically for enabling expandites rising from the third vertical conduit 36 to flow downward from the outlet end 41 of the second U-shaped conduit 40, as the expandites contract upon becoming more dense and thereby become non-buoyant in response to contact with the warm water.

The fourth vertical conduit 42 is coupled to the outlet of the second U-shaped conduit 40 for transporting the non-buoyant expandites and the water vertically downward in response to a pressure differential created in the water flowing through the circuit by the contraction of the expandites. The bottom 43 of the fourth vertical conduit 42 is coupled to the lower end of the first oblique conduit 30 for enabling expandites which have fallen through the fourth vertical conduit 42 to be forced up into the first oblique conduit 30 in response to pressure created by water flowing downward through the fourth vertical conduit 42.

The cold water exhaust conduit 18 is coupled near the top 35 of the second vertical conduit 34 below the second oblique conduit 38 for transporting the cold water from the second oblique conduit 38 upward to the transducer 20. (FIG. 1). The cold water exhaust conduit 18 is coupled to the second vertical 34 conduit by an oblique section 17 of the cold water exhaust conduit that slants downward from the second vertical conduit 34, to prevent expandites from being drawn into the exhaust conduit 16. Alternatively, or in addition thereto, a screen may be placed over the inlet to the conduit 16.

The warm water exhaust conduit 16 is coupled near the bottom 43 of the fourth vertical conduit 43 above the first oblique conduit 42 upward to the transducer 19. The warm water exhaust conduit 16 is coupled to the fourth vertical conduit 42 by an oblique section 15 of the warm water exhaust conduit 16, that slants upward from the fourth vertical conduit 42 to prevent expandites from being drawn into the exhaust conduit 16. Alternatively, or in addition thereto, a screen can be placed over the inlet to the conduit 18.

The system of FIG. 3 alternatively may also include a second cold water exhaust conduit 44 and a second warm water exhaust conduit 46.

The second cold water exhaust conduit 44 is coupled to the circuit near the outlet end 33 of the first U-shaped conduit 32 at a depth where the absolute pressure in the circuit is slightly greater than the absolute pressure in the ocean. The second cold water exhaust conduit 44 is slanted downward from the circuit for exhausting some of the cold water to increase the proportion of expandites to cold water in the second vertical conduit 34 above to thereby increase the upward flow pressure of the water and expandites in the second vertical conduit 34.

The second warm water exhaust conduit 46 is coupled to the circuit near the outlet end 41 of the second U-shaped conduit 40 at a depth where the absolute pressure in the circuit is slightly greater than the absolute pressure in the ocean. The second warm water exhaust conduit 46 is slanted upward from the circuit for exhausting some of the warm water to increase the proportion of expandites to warm water in the fourth vertical conduit 42 below to thereby increase the downward flow pressure of the water and expandites in the fourth vertical conduit 42.

Another preferred embodiment of an ocean thermal energy conversion system according to the present invention is described in relation to FIG. 4.

In the embodiment shown in FIG. 4, the expandites have the properties of being buoyant in ocean water, becoming less dense with an increase in temperature at a given pressure and undergoing a substantial change in buoyancy with respect to ocean water at a given combination of sub-surface ocean temperature and pressure. Preferred expandites include carbon dioxide and ammonia. These expandites vaporize at temperatures above the given sub-surface ocean temperature at the highest pressure in the circuit and condense at temperatures below the given sub-surface ocean temperature at the lowest pressure in the circuit.

The mass transport conduit circuit includes a warm water intake conduit 12, a first horizontal conduit 50, a first casing 52, a first air compressor 54, a first vertical conduit 56, a cold water intake conduit 14, a second horizontal conduit 58, a second casing 60, a warm water exhaust conduit 16, a second air compressor 62, a second vertical conduit 64, a third vertical conduit 66, a first cold water exhaust conduit 18, a fourth vertical conduit 68 and a second cold water exhaust conduit 70. The air compressors 54, 62 are located above the ocean surface.

The warm water intake conduit 12 extends to the ocean surface 11 for introducing warm water having a temperature substantially above the given sub-surface ocean temperature into the circuit from the surface.

The first horizontal conduit 50 has an inlet end 49 coupled to the warm water intake conduit 12 for receiving warm water, has an outlet end 51 for enabling the received warm water to flow out therefrom, and further has a top opening 55.

The first casing 52 defines a first chamber 53 coupled to the top opening 55 in the first horizontal conduit 50.

The first air compressor 54 provides air pressure within the first chamber 53 for gradually introducing into the first horizontal conduit 50 expandites flowing from the remainder of the circuit that are contracted as a result of exposure to water at a temperature below the given sub-surface ocean temperature.

The first vertical conduit 56 has a bottom end coupled to the outlet end 51 of the first horizontal conduit 50 for transporting the buoyant expandites and the water vertically upward in response to a pressure differential created in the water flowing through the circuit by expansion of the expandites caused by contact with the warm water.

The cold water intake conduit 14 extends to an ocean depth where the water temperature is substantially below the given sub-surface ocean temperature for introducing cold water from such depth into the circuit.

The second horizontal conduit 58 has an inlet end 57 coupled to the cold water intake conduit 14 for receiving cold water, has an outlet end 59 for enabling the received cold water to flow out therefrom, and further having a top opening 63.

The second casing 60 defines a second chamber 61 coupled to the top opening 63 in the second horizontal conduit 58. The chamber 61 is further coupled to the top of the first vertical conduit 56 for receiving expandites flowing upward from the first vertical conduit 56.

The warm water exhaust conduit 16 is coupled near and below the top of the first vertical conduit 56 for transporting the warm water from the first vertical conduit 56 upward to the transducer 19, (FIG. 1).

The second air compressor 62 provides air pressure within the second chamber 61 for gradually introducing into the second horizontal conduit 58 the expandites received from the first vertical conduit 56.

The second vertical conduit 64 has a bottom end coupled to the cold water and the expandites vertically upward in response to a pressure differential created in the water flowing through the circuit by said buoyancy of the expandites. However, the expandites contract and become less buoyant in response to contact with said cold water as they flow to the top of the second vertical conduit 64.

The third vertical conduit 66 having a top end coupled to the top end of the second vertical conduit 64 for transporting the expandites and the water vertically downward in response to the flow pressure of the water at the top of the second vertical conduit 64.

The first cold water exhaust conduit 18 is coupled near and below the top of the second vertical conduit 64 for transporting the cold water from the second vertical conduit 64 upward to the transducer, 20 (FIG. 1).

The fourth vertical conduit 68 has a bottom end coupled to the bottom end of the third vertical conduit 66 for receiving water and expandites from the third vertical conduit 66; and has a top end coupled to the first chamber 53 for delivering contracted expandites into the first chamber 53.

The second cold water exhaust conduit 70 is coupled near and below the top of the fourth vertical conduit 68 for exhausting water from the fourth vertical conduit 68 in the ocean. Screens 72 are provided at the inlets of the exhaust conduits 16, 18, 70 to prevent the expandites from being drawn into the exhaust conduits.

Figure 5:
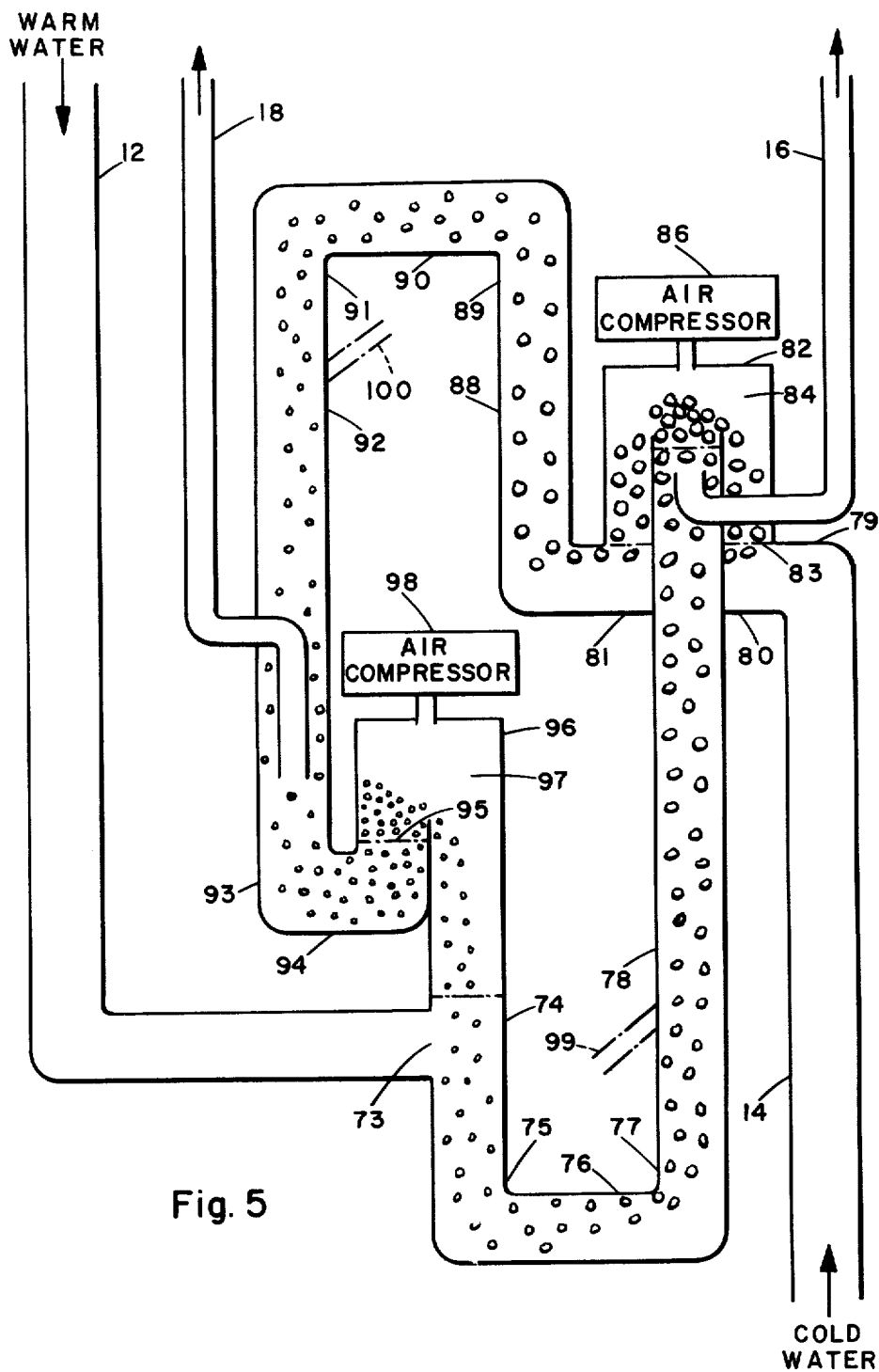
FIG. 5 is a schematic diagram of a preferred embodiment of the system of the present invention utilizing expandites that expand upon being heated and undergo a buoyancy reversal with respect to ocean water at a given sub-surface ocean temperature.

Still another preferred embodiment of an ocean thermal energy conversion system according to the present invention is described in relation to FIG. 5.

In the embodiment shown in FIG. 5, the expandites have the properties of becoming less dense with an increase in temperature at a given pressure and undergoing a reversal in buoyancy with respect to ocean water at a given combination of sub-surface ocean temperature and pressure. These expandites vaporize at temperatures above the given sub-surface ocean temperature at the highest pressure in the circuit and condense at temperatures below the given sub-surface ocean temperature at the lowest pressure in the circuit.

The mass transport conduit circuit includes a warm water intake conduit 12, a first vertical conduit 74, a first U-shaped conduit 76, a second vertical conduit 78, a cold water intake conduit 14, a horizontal conduit 80, a first casing 82, a warm water exhaust conduit 16, a first air compressor 86, a third vertical conduit 88, a second U-shaped conduit 90, a fourth vertical conduit 92, a third U-shaped conduit 94, a cold water exhaust conduit 18, a second casing 96 and a second air compressor 98. The air compressors 86, 98 are located above the ocean surface.

The warm water intake conduit 12 extends to near the ocean surface 11 for introducing warm water having a temperature substantially above the given sub-surface ocean temperature into the circuit from the surface.

The first vertical conduit 74 has a side opening 73 coupled to the warm water intake conduit 12 for receiving the warm water, and has a top end for receiving expandites flowing from the remainder of the circuit that are at a temperature that causes them to be non-buoyant with respect to ocean water. As a result the espandites fall within the first vertical conduit 74 upon introduction thereto.

The first U-shaped conduit 76 has an inlet end 75 coupled to the bottom of the first vertical conduit 74 and an outlet end 77 that extends vertically for enabling expandites falling from the first vertical conduit 74 to flow upward from the outlet end 77 of the first U-shaped conduit 76 as the expandites expand upon becoming less dense and thereby become buoyant in response to contact with the warm water.

The second vertical conduit 78 has its bottom coupled to the outlet end 77 of the first U-shaped conduit 76 for transporting the buoyant expandites and the warm water vertically upward in response to a pressure differential created in the water flowing through the circuit by the expansion of the expandites.

The cold water intake conduit 14 extends to an ocean depth where the water temperature is substantially below the given sub-surface ocean temperature for introducing cold water from such depth into the circuit.

The horizontal conduit 80 has an inlet end 79 coupled to the cold water intake conduit 14 for receiving the cold water, and has an outlet end 81 for enabling the received cold water to flow out therefrom, and further has a top opening 83.

The first casing 82 defines a first chamber 84 coupled to the top opening 83 in the horizontal conduit 80. The chamber 84 is also coupled to the top of the second vertical conduit 78 for receiving expandites flowing upward from the second vertical conduit 78.

The warm water exhaust conduit 16 is coupled near and below the top of the second vertical conduit 78 for transporting the warm water from the second vertical conduit 78 upward to the transducer 19 (FIG. 1).

The first air compressor 86 provides air pressure within the first chamber 84 for gradually introducing into the horizontal conduit 80 the expandites received from the second vertical conduit 78.

The third vertical conduit 88 has a bottom end coupled to the outlet end 79 of the horizontal conduit 80 for transporting the cold water and the expandites vertically upward in response to a pressure differential created in the water flowing through the circuit by the buoyancy of the expandites. However, the expandites contract and become less buoyant in response to contact with the cold water as they flow to the top of the third vertical conduit 88.

The second U-shaped conduit 90 has an inlet end 89 coupled to the top of the third vertical conduit 88 and an outlet end 91 that extends vertically for enabling expandites rising from the third vertical conduit 88 to flow downward from the outlet 91 of the second U-shaped conduit as the expandites contract upon becoming more dense and thereby become non-buoyant in response to contact with the cold water.

The fourth vertical conduit 92 is coupled to the outlet end 91 of the second U-shaped conduit 90 for transporting the non-buoyant expandites and the cold water vertically downward in response to a pressure differential created in the water flowing through the circuit by the contraction of the expandites.

The third U-shaped conduit 94 has an inlet end 93 coupled to the bottom of the fourth vertical conduit 92 for collecting expandites falling within the fourth vertical conduit 92. The third U-shaped conduit 94 also has an outlet end 95 extending vertically upward for enabling expandites to be emitted from the outlet end when the third U-shaped conduit 94 is full of expandites.

The cold water exhaust conduit 18 is coupled near the bottom of the fourth vertical conduit 92 above the third U-shaped conduit 94 for transporting the cold water from the fourth vertical conduit 92 upward to the transducer 20 (FIG. 1).

The second casing 96 defines a second chamber 97, which is coupled to the outlet end 95 of the third U-shaped conduit 94, and also is coupled to the top of the first vertical conduit 74.

The second air compressor 98 provides air pressure within the second chamber 97 for gradually introducing into the first vertical conduit 74, the non-buoyant expandites emitted from the outlet end 95 of the third U-shaped conduit 94.

The system of the present invention is somewhat inherently self cleaning as a result of the expandites contacting each other and the insides of the conduits to prevent the growth of algae and the like, and thereby reduce biofouling.

In the embodiments described above, in order to prevent thermal polution at the ocean surface, the water exhausted from the warm water exhaust conduit 16 and the cold water exhaust conduit 18 be piped down to the sub-surface ocean level that has the same temperature as the exhausted water after passing the exhausted water through the transducers 19, 20. No propulsion will be required to pipe the exhaust water down because exhausted water is colder than the surface water. Since the water is colder, it will be more dense, and will flow down without the aid of additional energy.

The system of FIG. 5 alternatively may also include a second warm water exhaust conduit 99 and a second cold water exhaust conduit 100.

The second warm water exhaust conduit 99 is coupled to the circuit near the outlet end 77 of the first U-shaped conduit 76 at a depth where the absolute pressure in the circuit is slightly greater than the absolute pressure in the ocean. The second warm water exhaust conduit 99 is slanted downward from the circuit for exhausting some of the warm water to increase the proportion of expandites to warm water in the second vertical conduit 78 above to thereby increase the upward flow pressure of the water and expandites in the second vertical conduit 78.

The second cold water exhaust conduit 100 is coupled to the circuit near the outlet end 91 of the second U-shaped conduit 90 at a depth where the absolute pressure in the circuit is slightly greater than the absolute pressure in the ocean. The second cold water exhaust conduit 100 is slanted upward from the circuit for exhausting some of the cold water to increase the proportion of expandites to cold water in the fourth vertical conduit 92 below to thereby increase the downward flow pressure of the water and expandites in the fourth vertical conduit 92.

The system of FIG. 4 alternatively may also include a second warm water exhaust conduit 71.

The second warm water exhaust conduit 71 is coupled to the first vertical conduit 56 at a depth where the absolute pressure in the circuit is greater than the absolute pressure in the ocean. The second warm water exhaust conduit 71 is slanted downward from the first vertical conduit 56 for exhausting some of the warm water to increase the proportion of expandites to warm water in the first vertical conduit 56 above to thereby increase the upward flow pressure of the water and expandites in the first vertical conduit 56.

The system of FIG. 3 can be used with expandites that have the properties of becoming less dense with an increase in temperature at a given pressure and undergoing a reversal in buoyancy with respect to ocean water at a given combination of sub-surface ocean temperature and pressure by reversing the respective connections of the warm water intake conduit 12 and the cold water intake conduit 14 to the remainder of the circuit.

The system of FIG. 4 can be used with expandites that have the properties of being buoyant in ocean water, becoming less dense with a decrease in temperature at a given pressure and undergoing a substantial change in buoyancy with respect to ocean water at a given combination of sub-surface ocean temperature and pressure by reversing the respective connections of the warm water intake conduit 12 and the cold water intake conduit 14 to the remainder of the circuit. For such an alternative embodiment, the expandites preferably undergo a phase transformation between the solid and liquid states at approximately the given temperature.

The system of FIG. 5 can be used with expandites that have the properties of becoming less dense with a decrease in temperature at a given pressure and undergoing a reversal in buoyancy with respect to ocean water at a given combination of sub-surface ocean temperature and pressure by reversing the respective connections of the warm water intake conduit 12 and the cold water intake conduit 14 to the remainder of the circuit. For such an alternative embodiment, the expandites preferably undergo a phase transformation between the solid and liquid states at approximately the given temperature.

I claim:

1. A thermal energy conversion system, comprising:
a mass of expandites that change density in response to changes in temperature at a given pressure to thereby change buoyancy with respect to a surrounding fluid;
a mass transport conduit circuit for introducing the expandites to a surrounding fluid at different combinations of temperature and pressure and transporting the expandites and the surrounding fluid in response to pressure differentials created by density changes of the expandites and concomitant buoyancy changes of the expandites as the expandites are exposed to the surrounding fluid at different combinations of pressure and temperature; and
a transducer for converting the pressure of the fluid transported by the circuit to a useful form of energy.

2. A system according to claim 1, wherein the surrounding fluid is water.

3. A system according to claim 1 further comprising a plurality of flexible coverings respectively encasing the expandites, wherein the coverings comprise a material that is insoluble in both the expandite and said surrounding fluid.

4. A system according to claim 3, wherein the coverings have a drag inducing configuration with respect to the surrounding fluid and an outside surface that is configured to minimize drag with respect to the conduits.

5. A system according to claim 3, wherein the flexible coverings comprise plastic bags.

6. A system according to claim 3, wherein each covered expandite defines an expandite unit and each expandite unit further comprises a third material, wherein the third material has a density that differs from that of the expandite, whereby the average density of each expandite unit is different from the density of the encased expandite.

7. A system according to claim 1, 2, 3 or 4, wherein
the expandites have the properties of becoming less dense with a decrease in temperature at a given pressure and undergoing a reversal in buoyancy with respect to the surrounding fluid at a given combination of temperature and pressure; and
the mass transport conduit circuit comprise
means for introducing cold fluid that is substantially below said given temperature into the circuit;
means for gradually introducing into the cold fluid expandites that are at a temperature that causes them to be non-buoyant, whereby the expandites expand and become less dense and thereby become buoyant in response to contact with said cold fluid;
means for transporting the buoyant expandites and the cold fluid in response to a pressure differential created in the fluid flowing through the circuit by said expansion of the expandites;
means for transporting said pressurized cold fluid to a transducer for converting the pressure of said transported fluid to a useful form of energy;
means for introducing warm fluid that is substantially above said given temperature into the circuit;
means for gradually introducing the expanded buoyant expandites into the warm fluid, whereby the expandites contract and become less dense and theregy become non-buoyant in response to contact with said warm fluid;
means for transporting the non-buoyant expandites and the warm fluid in response to a pressure differential created in the fluid flowing through the circuit by said contraction of the expandites;
means for transporting said pressurized warm fluid to a transducer for converting the pressure of the transported fluid to a useful form of energy; and
means for gradually reintroducing the contracted nonbuoyant expandites into the cold fluid that is introduced into the circuit.

8. A system according to claims 1, 2, 3 or 4 wherein the expandites have the properties of being buoyant in the surrounding fluid, becoming less dense with an increase in temperature at a given pressure and undergoing a substantial change in buoyancy with respect to the surrounding fluid at a given combination of temperature and pressure; and the mass transport conduit circuit comprises means for introducing warm fluid that is substantially above said given temperature into the circuit;

means for gradually introducing into the warm fluid expandites that are contracted as a result of exposure to fluid at a temperature below said given temperature, whereby the expandites expand and become less dense and thereby more buoyant in response to contact with said warm fluid;

means for transporting the more buoyant expandites and the warm fluid in response to a pressure differential created in the fluid flowing through the circuit by expansion of the expandites;

means for transporting said pressurized warm fluid to a transducer for converting the pressure of said transported fluid to a useful form of energy;

means for introducing cold fluid that is substantially below said given temperature into the circuit;

means for gradually introducing the expanded more buoyant expandites into the cold fluid, whereby the expandites become more dense and thereby less buoyant in response to contact with said cold fluid;

means for transporting the less buoyant expandites and the cold fluid in response to a pressure differential created in the fluid flowing through the circuit by the buoyancy of the expandites;

means for transporting said pressurized cold fluid to a transducer for converting the pressure of said transported fluid to a useful form of energy; and means for gradually reintroducing the less buoyant expandites into the warm fluid that is introduced into the circuit.

9. A system according to claims 1, 2, 3 or 4 wherein the expandites have the properties of becoming less dense with an increase in temperature at a given pressure and undergoing a reversal in buoyancy with respect to the surrounding fluid at a given combination of temperature and pressure, and the mass transport conduit circuit comprises means for introducing warm fluid that is substantially above said given temperature into the circuit;

means for gradually introducing into the warm fluid expandites that are at a temperature that causes them to be nonbuoyant, whereby the expandites expand and become less dense and thereby become buoyant in response to contact with said warm fluid;

means for transporting the buoyant expandites and the warm fluid in response to a pressure differential created in the fluid flowing through the circuit by said expansion of the expandites;

means for transporting said pressurized warm fluid to a transducer for converting the pressure of said transported fluid to a useful form of energy;

means for introducing cold fluid that is substantially below said given temperature into the circuit;

means for gradually introducing the expanded buoyant expandites into the cold fluid, whereby the expandites contract and become less dense and thereby become non-buoyant in response to contact with said cold fluid;

means for transporting the non-buoyant expandites and the cold fluid in response to a pressure differential created in the fluid flowing through the circuit by said contraction of the expandites;

means for transporting said pressurized cold fluid to a transducer for converting the pressure of the transported fluid to a useful form of energy; and means for gradually reintroducing the contracted non-buoyant expandites into the warm fluid that is introduced into the circuit.

10. A system according to claim 1, wherein the surrounding fluid is ocean water;

the expandites have the properties of becoming less dense with a decrease in temperature at a given pressure and undergoing a reversal in buoyancy with respect to ocean water at a given combination of sub-surface ocean temperature and pressure; and the mass transport conduit circuit comprises a cold water intake conduit extending to an ocean depth where the water temperature is substantially below said given sub-surface ocean temperature for introducing cold water from such depth into the circuit;

a first vertical conduit coupled to the cold water intake conduit for receiving said cold water;

a first oblique conduit coupled to the first vertical conduit below the cold water intake conduit, and slanted downward with respect to the first vertical conduit for gradually introducing into the first vertical conduit expandites flowing from the remainder of the circuit that are at a temperature that causes them to be nonbuoyant with respect to ocean water, whereby the expandites fall within the first vertical conduit upon introduction thereto;

a first U-shaped conduit having an inlet end coupled to the bottom of the first vertical conduit and an outlet end that extends vertically for enabling expandites falling from the first vertical conduit to flow upward from the outlet end of the first U-shaped conduit as the expandites expand and become less dense and thereby become buoyant in response to contact with said cold water;

a second vertical conduit coupled to the outlet end of the first U-shaped conduit for transporting the buoyant expandites and the cold water vertically upward in response to a pressure differential created in the water flowing through the circuit by said expansion of the expandites;

a warm water intake conduit extending to near the ocean surface for introducing warm water having a temperature substantially above said given sub-surface ocean temperature into the circuit from the surface;

a third vertical conduit coupled to the warm water intake conduit for receiving said warm water;

a second oblique conduit coupled to the top of the second vertical conduit and coupled to the third vertical conduit above the warm water intake conduit, and slanted downward from the second vertical conduit to the third vertical conduit for collecting expandites rising within the second vertical conduit and for gradually introducing said collected expandites into the third vertical conduit, whereby said expandites rise within the third vertical conduit upon introduction thereto;

a second U-shaped conduit having an inlet end coupled to the top of the third vertical conduit and an outlet end that extends vertically for enabling expandites rising from the third vertical conduit to flow downward from the outlet end of the second U-shaped conduit as the expandites contract and become more dense and thereby become non-buoyant in response to contact with said warm water;

a fourth vertical conduit coupled to the outlet end of the second U-shaped conduit for transporting the non-buoyant expandites and the warm water vertically downward in response to a pressure differential created in the water flowing through the circuit by said contraction of the expandites; wherein the fourth vertical conduit is coupled to the lower end of the first oblique conduit for enabling expandites which have fallen through the fourth vertical conduit to be forced up into the first oblique conduit in response to pressure created by water flowing downward through the fourth vertical conduit;

a cold water exhaust conduit coupled near the top of the second vertical conduit below the second oblique conduit for transporting said cold water from the second vertical conduit upward to the transducer; and a warm water exhaust conduit coupled near the bottom of the fourth vertical conduit above the first oblique conduit for transporting said warm water from the fourth vertical conduit upward to the transducer.

11. A system according to claim 10, further comprising a second cold water exhaust conduit coupled to the circuit near the outlet end of the first U-shaped conduit at a depth where the absolute pressure in the circuit is slightly greater than the absolute pressure in the ocean, and slanted downward from the circuit for exhausting some of the cold water to increase the proportion of expandites to cold water in the second vertical conduit above to thereby increase the upward flow pressure of the water and expandites in the second vertical conduit.

12. A system according to claims 10 or 11, further comprising a second warm water exhaust conduit coupled to the circuit near the outlet end of the second U-shaped conduit at a depth where the absolute pressure in the circuit is slightly greater than the absolute pressure in the ocean, and slanted upward from the circuit for exhausting some of the warm water to increase the proportion of expandites to warm water in the fourth vertical conduit below to thereby increase the downward flow pressure of the water and expandites in the fourth vertical conduit.

13. A system according to claim 10, wherein the warm water exhaust conduit is coupled to the fourth vertical conduit by an oblique section of the warm water exhaust conduit that slants upward from the fourth vertical conduit.

14. A system according to claim 10, wherein the cold water exhaust conduit is coupled to the second vertical conduit by an oblique section of the cold water exhaust conduit that slants downward from the second vertical conduit.

15. A system according to claim 10, wherein each of the expandites comprise an encased material that freezes at approximately said given sub-surface ocean temperature, and expands substantially as it freezes.

16. A system according to claim 10, further comprising plastic bags respectively encasing the expandites.

17. A system according to claim 1, wherein the surrounding fluid is ocean water;

the expandites have the properties of being buoyant in ocean water, becoming less dense with an increase in temperature at a given pressure and undergoing a substantial change in buoyancy with respect to ocean water at a given combination of sub-surface ocean temperature and pressure; and the mass transport conduit circuit comprises a warm water intake conduit extending to near the ocean surface for introducing warm water having a temperature substantially above said given sub-surface ocean temperature into the circuit from the surface;

a first horizontal conduit having an inlet end coupled to the warm water intake conduit for receiving said warm water, and having an outlet end for enabling said received warm water to flow out therefrom, and further having a top opening;

a first casing defining a first chamber coupled to the top opening in the first horizontal conduit;

a first air compressor for providing air pressure within the first chamber for gradually introducing into the first horizontal conduit expandites flowing from the remainder of the circuit that are contracted as a result of exposure to water at a temperature below said given sub-surface ocean temperature;

a first vertical conduit having a bottom end coupled to the outlet end of the first horizontal conduit for transporting the buoyant expandites and the warm water vertically upward in response to a pressure differential created in the water flowing through the circuit by expansion of the expandites caused by contact with said warm water;

a cold water intake conduit extending to an ocean depth where the water temperature is substantially below said given sub-surface ocean temperature for introducing cold water from such depth into the circuit;

a second horizontal conduit having an inlet end coupled to the cold water intake conduit for receiving said cold water, and having an outlet end for enabling said received cold water to flow out therefrom, and further having a top opening;

a second casing defining a second chamber coupled to the top opening in the second horizontal conduit, and further coupled to the top of the first vertical conduit for receiving expandites flowing upward from the first vertical conduit;

a warm water exhaust conduit coupled near and below the top of the first vertical conduit for transporting said warm water from the first vertical conduit upward to the transducer;

a second air compressor for providing air pressure within the second chamber for gradually introducing into the second horizontal conduit the expandites received from the first vertical conduit;

a second vertical conduit having a bottom end coupled to the outlet end of the second horizontal conduit for transporting said cold water and the expandites vertically upward in response to a pressure differential created in the water flowing through the circuit by said buoyancy of the expandites, whereby the expandites contract and become less buoyant in response to contact with said cold water as they flow to the top of the second vertical conduit;

a third vertical conduit having a top end coupled to the top end of the second vertical conduit for transporting the expandites and the water vertically downward in response to the flow pressure of the water at the top of the second vertical conduit;

a first cold water exhaust conduit coupled near and below the top of the second vertical conduit for transporting said cold water from the second vertical conduit upward to the transducer;

a fourth vertical conduit having a bottom end coupled to the bottom end of the third vertical conduit for receiving water and expandites from the third vertical conduit, and having a top end coupled to the first chamber for delivering contracted expandites into the first chamber; and a second cold water exhaust conduit coupled near and below the top of the fourth vertical conduit for exhausting water from the fourth vertical conduit into the ocean.

18. A system according to claim 17, wherein each of the expandites comprise an encased material that vaporizes at temperatures above said given sub-surface ocean temperature at the highest pressure in the circuit and condenses at temperatures below said given sub-surface ocean temperature at the lowest pressure in the circuit.

19. A system according to claim 17, further comprising plastic bags respectively encasing the expandites.

20. A system according to claim 1 for use as an ocean thermal energy conversion system, wherein the surrounding fluid is ocean water;

the expandites have the properties of becoming less dense with an increase in temperature at a given pressure and undergoing a reversal in buoyancy with respect to ocean water at a given combination of sub-surface ocean temperature and pressure; and the mass transport conduit circuit comprises a warm water intake conduit extending to near the ocean surface for introducing warm water having a temperature substantially above said given sub-surface ocean temperature into the circuit from the surface;

a first vertical conduit having a side opening coupled to the warm water intake conduit for receiving said warm water, and having a top end for receiving expandites flowing from the remainder of the circuit that are at a temperature that causes them to be non-buoyant with respect to ocean water, whereby the expandites fall within the first vertical conduit upon introduction thereto, a first U-shaped conduit having an inlet end coupled to the bottom of the first vertical conduit and an outlet end that extends vertically for enabling expandites falling from the first vertical conduit to flow upward from the outlet end of the first U-shaped conduit as the expandites expand upon becoming less dense and thereby become buoyant in response to contact with said warm water;

a second vertical conduit coupled to the outlet end of the first U-shaped conduit for transporting the buoyant expandites and the warm water vertically upward in response to a pressure differential created in the water flowing through the circuit by said expansion of the expandites;

a cold water intake conduit extending to an ocean depth where the water temperature is substantially below said given sub-surface ocean temperature for introducing cold water from such depth into the circuit;

a horizontal conduit having an inlet end coupled to the cold water intake conduit for receiving said cold water, and having an outlet end for enabling said received cold water to flow out therefrom, and further having a top opening;

a first casing defining a first chamber coupled to the top opening in the horizontal conduit, and further coupled to the top of the second vertical conduit for receiving expandites flowing upward from the second vertical conduit;

a warm water exhaust conduit coupled near and below the top of the second vertical conduit for transporting said warm water from the second vertical conduit upward to the transducer;

a first air compressor for providing air pressure within the first chamber for gradually introducing into the horizontal conduit the expandites received from the second vertical conduit;

a third vertical conduit having a bottom end coupled to the outlet end of the horizontal conduit for transporting said cold water and the expandites vertically upward in response to a pressure differential created in the water flowing through the circuit by said buoyancy of the expandites, whereby the expandites contract and become less buoyant in response to contact with said cold water as they flow to the top of the third vertical conduit;

a second U-shaped conduit having an inlet end coupled to the top of the third vertical conduit and an outlet end that extends vertically for enabling expandites rising from the third vertical conduit to flow downward from the outlet of the second U-shaped conduit as the expandites contract upon becoming more dense and thereby become non-buoyant in response to contact with said cold water;

a fourth vertical conduit coupled to the outlet end of the second U-shaped conduit for transporting the non-buoyant expandites and the cold water vertically downward in response to a pressure differential created in the water flowing through the circuit by said contraction of the expandites;

a third U-shaped conduit having an inlet end coupled to the bottom of the fourth vertical conduit for collecting expandites falling within the fourth vertical conduit; and further having an outlet end extending vertically upward for enabling expandites to be emitted from the outlet end when the third U-shaped conduit is full of expandites;

a cold water exhaust conduit coupled near the bottom of the fourth vertical conduit above the third U-shaped conduit for transporting said cold water from the fourth vertical conduit upward to the transducer;

a second casing defining a second chamber coupled to the outlet end of the third U-shaped conduit and coupled to the top of the first vertical conduit; and a second air compressor for providing air pressure within the second chamber for gradually introducing into the first vertical conduit non-buoyant expandites emitted from the outlet end of the third U-shaped conduit.

21. A system according to claim 20, wherein each of the expandites comprise an encased material that vaporizes at temperatures above said given sub-surface ocean temperature at the highest pressure in the circuit and condenses at temperatures below said given sub-surface ocean temperature at the lowest pressure in the circuit.

22. A system according to claim 20, further comprising plastic bags respectively encasing the expandites.

23. A method of thermal energy conversion comprising the steps of:
  (a) providing a mass of expandites that change density in response to changes in temperatures at a given pressure to thereby change buoyancy with respect to a surrounding fluid;
  (b) introducing the expandites to a surrounding fluid at different combinations of temperature and pressure;
  (c) transporting the expandites and the surrounding fluid through a mass transport conduit circuit in response to pressure differentials created by density changes of the expandites and concomitant buoyancy changes of the expandites with respect to the surrounding fluid as the expandites are exposed to the surrounding fluid at different combinations of pressure and temperature; and
  (d) converting the pressure of the transported fluid to a useful form of energy.

24. A method according to claim 23, wherein step (b) comprises
  introducing the expandites to water as the surrounding fluid.

25. A method according to claims 23 or 24, wherein step (a) comprises
  providing expandites that have the properties of becoming less dense with a decrease in temperature at a given pressure and undergoing a reversal in buoyancy with respect to the surrounding fluid at a given combination of temperature and pressure; and
  steps (b) and (c) comprise
  introducing cold fluid that is substantially below said given temperature into the circuit;
  gradually introducing into the cold fluid expandites that are at a temperature that causes them to be non-buoyant, whereby the expandites expand and become less dense and thereby become buoyant in response to contact with said cold fluid;
  transporting the buoyant expandites and the cold fluid in response to a pressure differential created in the fluid flowing through the circuit by said expansion of the expandites;
  transporting said pressurized cold fluid to a transducer for converting the pressure of said transported fluid to a useful form of energy;
  introducing warm fluid that is substantially above said given temperature into the circuit;
  gradually introducing the expanded buoyant expandites into the warm fluid, whereby the expandites contract and become less dense and theregy become non-buoyant in response to contact with said warm fluid;
  transporting the non-buoyant expandites and the warm fluid in response to a pressure differential created in the fluid flowing through the circuit by said contraction of the expandites;
  transporting said pressurized warm fluid to a transducer for converting the pressure of the transported fluid to a useful form of energy; and
  gradually reintroducing the contracted non-buoyant expandites into the cold fluid that is introduced into the circuit.

26. A method according to claims 23 or 24, wherein step (a) comprises
  providing expandites that have the properties of being buoyant in the surrounding fluid, becoming less dense with an increase in temperature at a given pressure and undergoing a substantial change in buoyancy with respect to the surrounding fluid at a given combination of temperature and pressure; and
  steps (b) and (c) comprise
  introducing warm fluid that is substantially above said given temperature into the circuit;
  gradually introducing into the warm fluid expandites that are contracted as a result of exposure to fluid at a temperature below said given temperature, whereby the expandites expand and become less dense and thereby more buoyant in response to contact with said warm fluid;
  transporting the more buoyant expandites and the warm fluid in response to a pressure differential created in the fluid flowing through the circuit by expansion of the expandites;
  transporting said pressurized warm fluid to a transducer for converting the pressure of said transported fluid to a useful form of energy
  introducing cold fluid that is substantially below said given temperature into the circuit;
  gradually introducing the expanded more buoyant expandites into the cold fluid, whereby the expandites become more dense and thereby less buoyant in response to contact with said cold fluid;
  transporting the less buoyant expandites and the cold fluid in response to a pressure differential created in the fluid flowing through the circuit by the buoyancy of the expandites;
  transporting said pressurized cold fluid to a transducer for converting the pressure of said transported fluid to a useful form of energy; and
  gradually reintroducing the less buoyant expandites into the warm fluid that is introduced into the circuit.

27. A method according to claims 23 or 24 wherein step (a) comprises
  providing expandites that have the properties of becoming less dense with an increase in temperature at a given pressure and undergoing a reversal in buoyancy with respect to the surrounding fluid at a given combination of temperature and pressure, and
  steps (d) and (c) comprise
  introducing warm fluid that is substantially above said given temperature into the circuit;
  gradually introducing into the warm fluid expandites that are at a temperature that causes them to be non-buoyant, whereby the expandites expand and become less dense and thereby become buoyant in response to contact with said warm fluid;
  transporting the buoyant expandites and the warm fluid in response to a pressure differential created in the fluid flowing through the circuit by said expansion of the expandites;
  transporting said pressurized warm fluid to a transducer for converting the pressure of said transported fluid to a useful form of energy;
  introducing cold fluid that is substantially below said given temperature into the circuit;
  gradually introducing the expanded buoyant expandites into the cold fluid, whereby the expandites contract and become less dense and thereby become non-buoyant in response to contact with said cold fluid;
  transporting the non-buoyant expandites and the cold fluid in response to a pressure differential created in the fluid flowing through the circuit by said contraction of the expandites;

transporting said pressurized cold fluid to a transducer for converting the pressure of the transported fluid to a useful form of energy; and gradually reintroducing the contracted non-buoyant expandites into the warm fluid that is introduced into the circuit.

28. A method according to claims 23 or 24, wherein step (a) comprises providing expandites that have the properties of being buoyant in the surrounding fluid, becoming less dense with a decrease in temperature at a given pressure and undergoing a substantial change in buoyancy with respect to the surrounding fluid at a given combination of temperature and pressure; and steps (b) and (c) comprise introducing cold fluid that is substantially below said given temperature into the circuit;

gradually introducing into the cold fluid expandites that are contracted as a result of exposure to fluid at a temperature above said given temperature, whereby the expandites expand and become less dense and thereby more buoyant in response to contact with said cold fluid;

transporting the more buoyant expandites and the cold fluid in response to a pressure differential created in the fluid flowing through the circuit by expansion of the expandites;

transporting said pressurized cold fluid to a transducer for converting the pressure of said transported fluid to a useful form of energy;

introducing warm fluid that is substantially above said given temperature into the circuit;

gradually introducing the expanded more buoyant expandites into the warm fluid, whereby the expandites become more dense and thereby less buoyant in response to contact with said warm fluid;

transporting the less buoyant expandites and the warm fluid in response to a pressure differential created in the fluid flowing through the circuit by the buoyancy of the expandites;

transporting said pressurized warm fluid to a transducer for converting the pressure of said transported fluid to a useful form of energy; and gradually reintroducing the less buoyant expandites into the cold fluid that is introduced into the circuit.

29. A system according to claims 1, 2, 3 or 4 wherein the expandites have the properties of being buoyant in the surrounding fluid, becoming less dense with a decrease in temperature at a given pressure and undergoing a substantial change in buoyancy with respect to the surrounding fluid at a given combination of temperature and pressure; and the mass transport conduit circuit comprises means for introducing cold fluid that is substantially below said given temperature into the circuit;

means for gradually introducing into the cold fluid expandites that are contracted as a result of exposure to fluid at a temperature above said given temperature, whereby the expandites expand and become less dense and thereby more buoyant in response to contact with said cold fluid;

means for transporting the more buoyant expandites and the cold fluid in response to a pressure differential created in the fluid flowing through the circuit by expansion of the expandites;

means for transporting said pressurized cold fluid to a transducer for converting the pressure of said transported fluid to a useful form of energy;

means for introducing warm fluid that is substantially above said given temperature into the circuit;

means for gradually introducing the expanded more buoyant expandites into the warm fluid, whereby the expandites become more dense and thereby less buoyant in response to contact with said warm fluid;

means for transporting the less buoyant expandites and the warm fluid in response to a pressure differential created in the fluid flowing through the circuit by the buoyancy of the expandites;

means for transporting said pressurized warm fluid to a transducer for converting the pressure of said transported fluid to a useful form of energy; and means for gradually reintroducing the less buoyant expandites into the cold fluid that is introduced into the circuit.

30. A system according to claim 1, wherein the surrounding fluid is ocean water;

the expandites have the properties of becoming less dense with an increase in temperature at a given pressure and undergoing a reversal in buoyancy with respect to ocean water at a given combination of sub-surface ocean temperature and pressure; and the mass transport conduit circuit comprises a warm water intake conduit extending to near the ocean surface for introducing warm water having a temperature substantially above said given sub-surface ocean temperature into the circuit;

a first vertical conduit coupled to the warm water intake conduit for receiving said warm water;

a first oblique conduit coupled to the first vertical conduit below the warm water intake conduit, and slanted downward with respect to the first vertical conduit for gradually introducing into the first vertical conduit expandites flowing from the remainder of the circuit that are at a temperature that causes them to be non-buoyant with respect to ocean water, whereby the expandites fall within the first vertical conduit upon introduction thereto;

a first U-shaped conduit having an inlet end coupled to the bottom of the first vertical conduit and an outlet end that extends vertically for enabling expandites falling from the first vertical conduit to flow upward from the outlet end of the first U-shaped conduit as the expandites expand and become less dense and thereby become buoyant in response to contact with said warm water;

a second vertical conduit coupled to the outlet end of the first U-shaped conduit for transporting the buoyant expandites and the warm water vertically upward in response to a pressure differential created in the water flowing through the circuit by said expansion of the expandites;

a cold water intake conduit extending to an ocean depth where the water temperature is substantially below said given subsurface ocean temperature for introducing cold water from such a depth into the circuit;

a third vertical conduit coupled to the warm water intake conduit for receiving said cold water;

a second oblique conduit coupled to the top of the second vertical conduit and coupled to the third vertical conduit above the cold water intake circuit, and slanted downward from the second vertical conduit to the third vertical conduit for collecting expandites rising within the second vertical conduit and for gradually introducing said collected expandites into the third vertical conduit, whereby said expandites rise within the third vertical conduit upon introduction thereto;

a second U-shaped conduit having an inlet end coupled to the top of the third vertical conduit and an outlet end that extends vertically for enabling expandites rising from the third vertical conduit to flow downward from the outlet end of the second U-shaped conduit as the expandites contract and become more dense and thereby become non-buoyant in response to contact with said cold water;

a fourth vertical conduit coupled to the outlet end of the second U-shaped conduit for transporting the non-buoyant expandites and the cold water vertically downward in response to a pressure differential created in the water flowing through the circuit by said contraction of the expandites; wherein the fourth vertical conduit is coupled to the lower end of the first oblique conduit for enabling expandites which have fallen through the fourth vertical conduit to be forced up into the first oblique conduit in response to pressure created by water flowing downward through the fourth vertical conduit;

a warm water exhaust conduit coupled near the top of the second vertical conduit below the second oblique conduit for transporting said warm water from the second vertical conduit upward to the transducer; and a cold water exhaust conduit coupled near the bottom of the fourth vertical conduit above the first oblique conduit for transporting said cold water from the fourth vertical conduit upward to the transducer.

31. A system according to claim 30, further comprising a second warm water exhaust conduit coupled to the circuit near the outlet end of the first U-shaped conduit at a depth where the absolute pressure in the circuit is slightly greater than the absolute pressure in the ocean, and slanted downward from the circuit for exhausting some of the warm water to increase the proportion of expandites to warm water in the second vertical conduit above to thereby increase the upward flow pressure of the water and expandites in the second vertical conduit.

32. A system according to claims 30 or 31, further comprising a second cold water exhaust conduit coupled to the circuit near the outlet end of the second U-shaped conduit at a depth where the absolute pressure in the circuit is slightly greater than the absolute pressure in the ocean, and slanted upward from the circuit for exhausting some of the cold water to increase the proportion of expandites to cold water in the fourth vertical conduit below to thereby increase the downward flow pressure of the water and expandites in the fourth vertical conduit.

33. A system according to claim 30, wherein each of the expandites comprise an encased material that melts at approximately said given sub-surface ocean temperature, and expands substantially as it melts.

34. A system according to claim 30, further comprising plastic bags respectively encasing the expandites.

35. A system according to claim 1, wherein the surrounding fluid is ocean water;

the expandites have the properties of being buoyant in ocean water, becoming less dense with a decrease in temperature at a given pressure and undergoing a substantial change in buoyancy with respect to ocean water at a given combination of sub-surface ocean temperature and pressure; and the mass transport conduit circuit comprises a cold water intake conduit extending to an ocean depth where the water temperature is substantially below said given sub-surface ocean temperature for introducing cold water from such depth into the circuit;

a first horizontal conduit having an inlet end coupled to the cold water intake conduit for receiving said cold water, and having an outlet end for enabling said receiving cold water to flow out therefrom, and further having a top opening;

a first casing defining a first chamber coupled to the top opening in the first horizontal conduit;

a first air compressor for providing air pressure within the first chamber for gradually introducing into the first horizontal conduit expandites flowing from the remainder of the circuit that are contracted as a result of exposure to water at a temperature above said given sub-surface ocean temperature;

a first vertical conduit having a bottom end coupled to the outlet end of the first horizontal conduit for transporting the buoyant expandites and the cold water vertically upward in response to a pressure differential created in the water flowing through the circuit by expansion of the expandites caused by contact with said cold water;

a warm water intake conduit extending to near the ocean surface for introducing warm water having a temperature substantially above said given sub-surface ocean temperature into the circuit from the surface;

a second horizontal conduit having an inlet end coupled to the warm water intake conduit for receiving said warm water, and having an outlet end for enabling said received warm water to flow out therefrom, and further having a top opening;

a second casing defining a second chamber coupled to the top opening in the second horizontal conduit, and further coupled to the top of the first vertical conduit for receiving expandites flowing upward from the first vertical conduit;

a cold water exhaust conduit coupled near and below the top of the first vertical conduit for transporting said cold water from the first vertical conduit upward to the transducer;

a second air compressor for providing air pressure within the second chamber for gradually introducing into the second horizontal conduit the expandites received from the first vertical conduit;

a second vertical conduit having a bottom end coupled to the outlet end of the second horizontal conduit for transporting said warm water and the expandites vertically upward in response to a pressure differential created in the water flowing through the circuit by said buoyancy of the expandites, whereby the expandites contract and become less buoyant in response to contact with said warm water as they flow to the top of the second vertical conduit;

a third vertical conduit having a top end coupled to the top end of the second vertical conduit for transporting the expandites and the water vertically downward in response to the flow pressure of the water at the top of the second vertical conduit;

a first warm water exhaust conduit coupled near and below the top of the second vertical conduit for transporting said warm water from the second vertical conduit upward to the transducer;

a fourth vertical conduit having a bottom end coupled to the bottom end of the third vertical conduit for receiving water and expandites from the third vertical conduit, and having a top end coupled to the first chamber for delivering contracted expandites into the first chambers; and a second warm water exhaust conduit coupled near and below the top of the fourth vertical conduit for exhausting water from the fourth vertical conduit into the ocean.

36. A system according to claim 35, further comprising a second cold water exhaust conduit coupled to the first vertical conduit at a depth where the absolute pressure in the circuit is greater than the absolute pressure in the ocean, and slanted downward from the first vertical conduit for exhausting some of the cold water to increase the proportion of expandites to cold water in the first vertical conduit above to thereby increase the upward flow pressure of the water and expandites in the first vertical conduit.

37. A system according to claim 35, wherein each of the expandites comprise an encased material that freezes at temperatures below said given sub-surface ocean temperature at the highest pressure in the circuit and melts at temperatures above said given sub-surface ocean temperature at the lowest pressure in the circuit.

38. A system according to claim 35, further comprising plastic bags respectively encasing the expandites.

39. A system according to claim 1 for use as an ocean thermal energy conversion system, wherein the surrounding fluid is ocean water;

the expandites have the properties of becoming less dense with a decrease in temperature at a given pressure and undergoing a reversal in buoyancy with respect to ocean water at a given combination of sub-surface ocean temperature and pressure; and the mass transport conduit circuit comprises a cold water intake conduit extending to an ocean depth where the water temperature is substantially below said given sub-surface ocean temperature for introducing cold water from such depth into the circuit;

a first vertical conduit having a side opening coupled to the cold water intake conduit for receiving said cold water, and having a top end for receiving expandites flowing from the remainder of the circuit that are at a temperature that causes them to be non-buoyant with respect to ocean water, whereby the expandites fall within the first vertical conduit upon introduction thereto, a first U-shaped conduit having an inlet end coupled to the bottom of the first vertical conduit and an outlet end that extends vertically for enabling expandites falling from the first vertical conduit to flow upward from the outlet end of the first U-shaped conduit as the expandites expand upon becoming less dense and thereby become buoyant in response to contact with said cold water;

a second vertical conduit coupled to the outlet end of the first U-shaped conduit for transporting the buoyant expandites and the cold water vertically upward in response to a pressure differential created in the water flowing through the circuit by said expansion of the expandites;

a warm water intake conduit extending to near the ocean surface of introducing warm water having a temperature substantially above said given sub-surface ocean temperature into the circuit from the surface;

a horizontal conduit having an inlet end coupled to the warm water intake conduit for receiving said warm water, and having an outlet end for enabling said received warm water to flow out therefrom, and further having a top opening;

a first casing defining a first chamber coupled to the top opening in the horizontal conduit, and further coupled to the top of the second vertical conduit for receiving expandites flowing upward from the second vertical conduit;

a cold water exhaust conduit coupled near and below the top of the second vertical conduit for transporting said cold water from the second vertical conduit upward to the transducer;

a first air compressor for providing air pressure within the first chamber for gradually introducing into the horizontal conduit the expandites received from the second vertical conduit;

a third vertical conduit having a bottom end coupled to the outlet end of the horizontal conduit for transporting said warm water and the expandites vertically upward in response to a pressure differential created in the water flowing through the circuit by said buoyancy of the expandites, whereby the expandites contract and become less buoyant in response to contact with said warm water as they flow to the top of the third vertical conduit;

a second U-shaped conduit having an inlet end coupled to the top of the third vertical conduit and an outlet end that extends vertically for enabling expandites rising from the third vertical conduit to flow downward from the outlet of the second U-shaped conduit as the expandites contract upon becoming more dense and thereby become non-buoyant in response to contact with said warm water;

a fourth vertical conduit coupled to the outlet end of the second U-shaped conduit for transporting the non-buoyant expandites and the warm water vertically downward in response to a pressure differential created in the water flowing through the circuit by said contraction of the expandites;

a third U-shaped conduit having an inlet end coupled to the bottom of the fourth vertical conduit for collecting expandites falling within the fourth vertical conduit; and further having an outlet end extending vertically upward for enabling expandites to be emitted from the outlet end when the third U-shaped conduit is full of expandites;

a warm water exhaust conduit coupled near the bottom of the fourth vertical conduit above the third U-shaped conduit for transporting said warm water from the fourth vertical conduit upward to the transducer;

a second casing defining a second chamber coupled to the outlet end of the third U-shaped conduit and coupled to the top of the first vertical conduit; and a second air compressor for providing air pressure within the second chamber for gradually introducing into the first vertical conduit non-buoyant expandites emitted from the outlet end of the third U-shaped conduit.

40. A system according to claim 39, wherein each of the expandites comprise an encased material that freezes at temperatures below said given sub-surface ocean temperature at the highest pressure in the circuit and melts at temperatures above said given sub-surface ocean temperature at the lowest pressure in the circuit.

41. A system according to claim 39, further comprising plastic bags respectively encasing the expandites.

42. A system according to claim 39, further comprising a second cold water exhaust conduit coupled to the circuit near the outlet end of the first U-shaped conduit at a depth where the absolute pressure in the circuit is slightly greater than the absolute pressure in the ocean, and slanted downward from the circuit for exhausting some of the cold water to increase the proportion of expandites to cold water in the second vertical conduit above to thereby increase the upward flow pressure of the water and expandites in the second vertical conduit.

43. A system according to claims 39 or 42, further comprising a second warm water exhaust conduit coupled to the circuit near the outlet end of the second U-shaped conduit at a depth where the absolute pressure in the circuit is slightly greater than the absolute pressure in the ocean, and slanted upward from the circuit for exhausting some of the warm water to increase the proportion of expandites to warm water in the fourth vertical conduit below to thereby increase the downward flow pressure of the water and expandites in the fourth vertical conduit.

44. A system according to claim 17, further comprising a second warm water exhaust conduit coupled to the first vertical conduit at a depth where the absolute pressure in the circuit is greater than the absolute pressure in the ocean, and slanted downward from the first vertical conduit for exhausting some of the warm water to increase the proportion of expandites to warm water in the first vertical conduit above to thereby increase the upward flow pressure of the water and expandites in the first vertical conduit.

45. A system according to claim 20, further comprising a second warm water exhaust conduit coupled to the circuit near the outlet end of the first U-shaped conduit at a depth where the absolute pressure in the circuit is slightly greater than the absolute pressure in the ocean, and slanted downward from the circuit for exhausting some of the warm water to increase the proportion of expandites to warm water in the second vertical conduit above to thereby increase the upward flow pressure of the water and expandites in the second vertical conduit.

46. A system according to claims 20 or 45, further comprising a second cold water exhaust conduit coupled to the circuit near the outlet end of the second U-shaped conduit at a depth where the absolute pressure in the circuit is slightly greater than the absolute pressure in the ocean, and slanted upward from the circuit for exhausting some of the cold water to increase the proportion of expandites to cold water in the fourth vertical conduit below to thereby increase the downward flow pressure of the water and expandites in the fourth vertical conduit.

* * * * *